Figure 2:
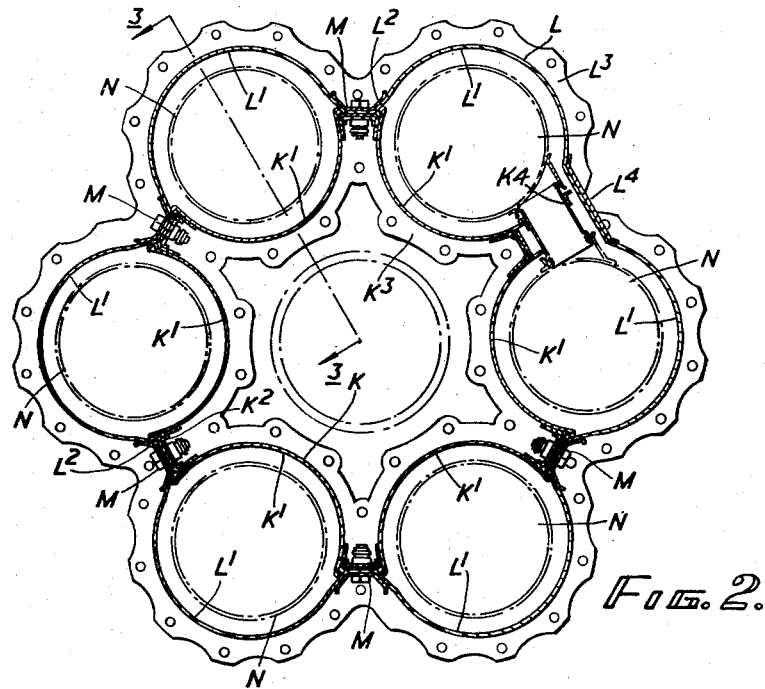

Jan. 24, 1961 G. F. UPTON 2,968,924
COMBUSTION CHAMBERS OF INTERNAL COMBUSTION TURBINE UNITS
Filed Aug. 9, 1955 2 Sheets-Sheet 1

INVENTOR
GEORGE FRANK UPTON
BY
ATTORNEYS

Jan. 24, 1961  G. F. UPTON  2,968,924
COMBUSTION CHAMBERS OF INTERNAL COMBUSTION TURBINE UNITS
Filed Aug. 9, 1955  2 Sheets-Sheet 2
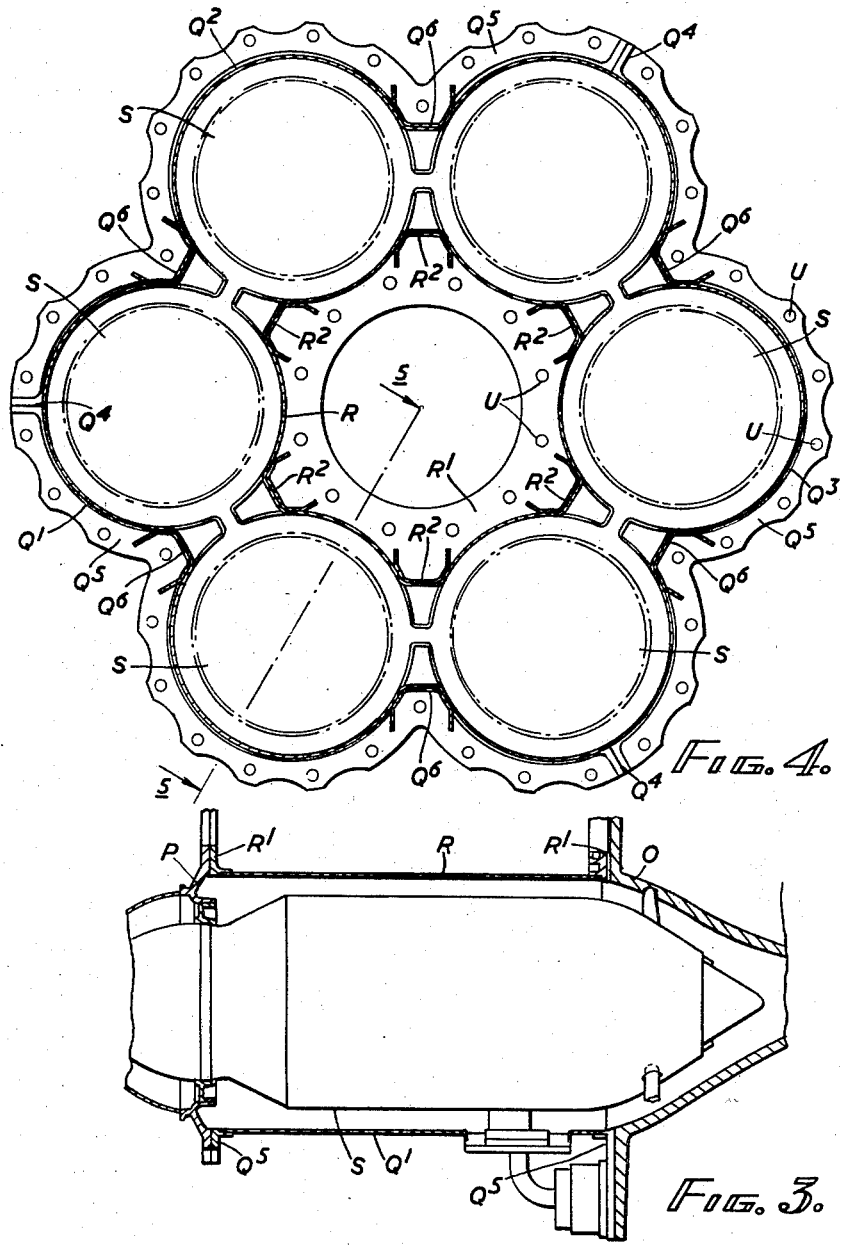
INVENTOR
GEORGE FRANK UPTON United States Patent Office 2,968,924
Patented Jan. 24, 1961

2,968,924

COMBUSTION CHAMBERS OF INTERNAL COMBUSTION TURBINE UNITS

George Frank Upton, Borehamwood, England, assignor to D. Napier & Son Limited, London, England, a British company Filed Aug. 9, 1955, Ser. No. 527,372

Claims priority, application Great Britain Aug. 18, 1954

1 Claim. (Cl. 60—39.37)

This invention relates to power units of the internal combustion turbine type and of the kind comprising a rotary compressor for compressing the combustion air, a turbine spaced from but arranged with the axis of its rotor coaxial with that of the compressor rotor and an annular series of combustion chambers extending between the compressor and turbine with their axes parallel or inclined to and circumferentially spaced around the axis of the turbine and compressor rotors and their ends communicating respectively with the outlet of the compressor and the inlet to the turbine, the rotors of the compressor and turbine being directly connected to one another so as to rotate as a unit while the casings of the compressor and turbine are rigidly connected to one another by a stress-taking structure with which they therefore form a rigid unit.

For convenience herein the terms "compressor casing" and "turbine casing" are used to include where appropriate a diffuser rigid with the compressor casing and an inlet structure rigid with the turbine casing and by which the gases from the combustion chambers are led to the nozzle ring of the turbine.

As at present made the stress-taking structure extending between the compressor casing and turbine casing of internal combustion turbine units of the above kind is in the form of a rigid tubular member around which the annular series of combustion chambers lie, and the object of the present invention is to provide an improved arrangement which will tend to enable the required rigidity to be achieved with reduced weight.

In an internal combustion turbine unit of the kind referred to according to the present invention the turbine casing is rigidly connected to the compressor casing by a rigid stress-taking combustion chamber assembly comprising inner and outer walls lying around the axis of the unit as a whole and around each other, the inner wall being formed to provide in its outer surface a series of recesses extending longitudinally thereof while the outer wall is formed to provide in its inner surface a similar number of longitudinally extending recesses each lying opposite to one of the recesses in the inner wall, the parts of the inner and outer walls lying between the recesses being rigidly connected to one another either directly or by intermediate walls, and each of the longitudinally extending chambers thus formed by a cooperating pair of recesses respectively in the inner and outer walls (and the adjacent pair of intermediate walls when provided) constituting the outer stress-taking wall of a combustion chamber while the ends of the structure formed by the inner and outer walls are rigidly connected respectively to the compressor casing and the turbine casing.

Either or each end of the stress-taking structure constituted by the inner and outer walls may either be rigidly connected to the compressor or turbine casing adjacent to its outer periphery only and arranged to make a sliding joint with such casing adjacent to its inner periphery, or may be rigidly connected to the compressor or turbine casing adjacent to both its outer periphery and its inner periphery. In any case it will be understood that the ends of the outer wall will be provided with flanges to receive bolts for connecting such ends respectively to the compressor casing and the turbine casing, while, when the structure is also to be connected to either of these casings around its inner periphery the appropriate end or each end of the inner wall will also be provided with a flange to receive bolts for this purpose.

It will further be appreciated that in internal combustion turbine units according to the invention, each combustion chamber will usually include an inner combustion tube, or so-called "flame tube" lying within and spaced from the outer stress-taking wall of the combustion chamber in a manner generally known per se and common in the art.

Figure 1:
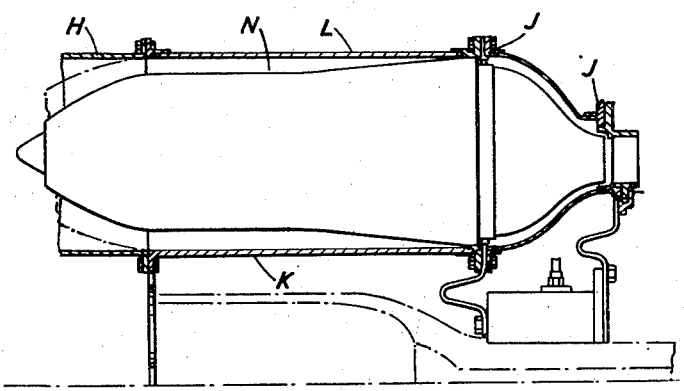

Two forms of combustion chamber assembly and the adjacent parts of the compressor and turbine casings of combustion turbine units according to the invention are shown somewhat diagrammatically in the accompanying drawings, in which Figure 1 is a sectional side elevation of one combustion chamber on the lines 3—3 in Figure 2, Figure 2 is a cross-section through the complete combustion chamber assembly in a plane normal to the axis of the assembly, Figure 3 is a similar view to Figure 1 on the line 5—5 in Figure 4 of another construction of combustion chamber, and Figure 4 is a cross-section through the complete assembly including combustion chambers as illustrated in Figure 3 in a plane normal to the axis of the assembly.

In the construction shown in Figures 1 and 2 the delivery end of the compressor casing is indicated by the reference letter H while the inlet end of the turbine casing is indicated by the reference letter J.

In this construction the combustion chamber assembly comprises an inner wall K and an outer wall L lying about the axis of the unit and around each other, the inner wall J being formed to provide in its outer surface six longitudinally extending approximately semi-cylindrical recesses $K^1$ while the outer wall L is similarly formed to provide in its inner circumferential surface six longitudinally extending approximately semi-cylindrical recesses $L^1$. The parts $K^2$, $L^2$ between the recesses $K^1$ and $L^1$ are rigidly connected to one another by bolts as indicated at M while at their ends the two walls are formed or provided with radially extending flanges $K^3$ and $L^3$ by which such ends are rigidly connected by bolts respectively to the compressor casing H and turbine casing J.

Secured at parts of the inner and outer walls K and L which lie between the tubular chambers N formed by the recesses $K^1$ and $L^1$ are plates $K^4$ and $L^4$ which are welded to the walls K and L. These jointly form tangentially extending passages by which adjacent chambers N communicate with one another for the purpose of the transmission of combustion between the chambers.

In the construction shown in Figures 3 and 4 the outlet end of the compressor casing is indicated by the reference letter O while the inlet end of the turbine casing is indicated by the reference letter P. In this construction the combustion chamber assembly comprises an outer wall comprising three similar sections $Q^1$, $Q^2$, $Q^3$ rigidly connected to one another by longitudinal flanges $Q^4$ to form an outer wall of the same general form as, though differing in detail from, the outer wall L in the construction shown in Figures 3 and 4, and an inner wall R of similar general form to the inner wall K in the construction shown in Figures 3 and 4, though differing in detail therefrom.

In the construction shown in Figures 3 and 4, instead of the inner and outer walls R and $Q^1$, $Q^2$, $Q^3$ being directly rigidly connected to one another between the recesses therein forming the chambers S they are maintained in their correct relationship only by being rigidly connected by means of flanges $Q^4$, $R^1$ at their ends respectively to the compressor casing O and the turbine casing P and are given additional rigidity by bridging walls $Q^5$, $R^2$ extending between and rigidly connected as by welding to the parts of the walls between the part-cylindrical recesses therein as shown.

In this construction the "flanges" $R^1$ at the ends of the inner wall may have circular central apertures as shown in Figure 4 and the flanges at both the ends of the inner and outer walls may be rigidly connected respectively to the compressor and turbine casings by bolts passing through holes U.

In each of the constructions described above with reference to the drawings the tubular chambers contain the usual flame tubes and associated parts, which may be of conventional form and will not therefore be further described herein.

What I claim as my invention and desire to secure by Letters Patent is:

A combustion chamber assembly for an internal combustion turbine unit comprising, separate inner and outer rigid walls disposed concentrically in tubular formation respectively about a common axis, said walls respectively being formed with relatively opposed complementary recesses defining cylindrical combustion chambers, said inner and outer walls abutting each other between said combustion chambers, said chambers being disposed annularly around and with their axes parallel to said common axis and means rigidly interconnecting the abutting portions of said inner and outer walls.

References Cited in the file of this patent

UNITED STATES PATENTS

| | | |
|---|---|---|
| 1,599,457 | Chaleil | Sept. 14, 1926 |
| 2,531,810 | Fyffe | Nov. 28, 1950 |
| 2,563,744 | Price | Aug. 7, 1951 |
| 2,670,600 | Owner et al. | Mar. 2, 1954 |
| 2,676,459 | Marchant | Apr. 27, 1954 |
| 2,709,894 | Oulianoff et al. | June 7, 1955 |
| 2,780,060 | Griffith | Feb. 5, 1957 |

FOREIGN PATENTS

| | | |
|---|---|---|
| 850,087 | Germany | Sept. 22, 1952 |